(12) United States Patent
Lui et al.

(10) Patent No.: US 7,168,038 B2
(45) Date of Patent: Jan. 23, 2007

(54) SYSTEM AND METHOD FOR SCALING AND REPOSITIONING DRAWINGS

(75) Inventors: Charlton E. Lui, Redmond, WA (US); Dan Altman, Kirkland, WA (US); Anthony Scott Smith, Sammamish, WA (US); Cynthia Tee, Bellevue, WA (US); Shenbagalakshmi Pichaiah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 09/918,722

(22) Filed: Aug. 1, 2001

(65) Prior Publication Data

US 2004/0205624 A1  Oct. 14, 2004

(51) Int. Cl.
*G06F 15/00* (2006.01)
*G06K 9/34* (2006.01)
*G06K 9/32* (2006.01)

(52) U.S. Cl. ............... 715/530; 715/517; 715/518; 715/519; 715/520; 715/521; 715/523; 715/531; 382/173; 382/175; 382/176; 382/294

(58) Field of Classification Search ........ 715/517–521, 715/530–531, 523; 382/294, 173–176, 178
See application file for complete search history.

(56) References Cited

U.S. PATENT DOCUMENTS

| 4,156,237 | A | | 5/1979 | Okata et al. |
| 4,521,770 | A | | 6/1985 | Rhyne |
| 4,709,348 | A | | 11/1987 | Horn et al. |
| 4,712,140 | A | * | 12/1987 | Mintzer et al. ............. 382/298 |
| 5,091,964 | A | * | 2/1992 | Shimomura ................. 382/174 |
| 5,146,552 | A | | 9/1992 | Cassorla et al. |
| 5,148,155 | A | | 9/1992 | Martin et al. |
| 5,239,466 | A | | 8/1993 | Morgan et al. |
| 5,349,648 | A | | 9/1994 | Handley |
| 5,434,965 | A | | 7/1995 | Matheny et al. |
| 5,465,325 | A | | 11/1995 | Capps et al. |
| 5,473,742 | A | | 12/1995 | Polyakov et al. |
| 5,509,663 | A | | 4/1996 | Otake et al. |

(Continued)

FOREIGN PATENT DOCUMENTS

EP           902379 A2      3/1999

(Continued)

OTHER PUBLICATIONS

U.S. Appl. No. 10/972,391, filed Oct. 26, 2004, Dresevic et al.

(Continued)

*Primary Examiner*—Doug Hutton
*Assistant Examiner*—Chau Nguyen
(74) *Attorney, Agent, or Firm*—Banner and Witcoff, Ltd.

(57) ABSTRACT

A computer system and method relating to editing an electronic document having both text and drawings is disclosed. Drawings may be rescaled and/or repositioned responsive to a change in line height or font size of text. The resealing may be done in proportion to the change in line height or font size, and the repositioning may be performed to avoid overlapping of the rescaled drawings. A document may be divided into a plurality of adjacent regions, and drawings within the document may each have an offset value representing a distance between the drawing and a reference axis of one of the regions.

20 Claims, 14 Drawing Sheets

U.S. PATENT DOCUMENTS

| | | |
|---|---|---|
| 5,534,893 A | 7/1996 | Hansen et al. |
| 5,572,643 A | 11/1996 | Judson |
| 5,613,019 A | 3/1997 | Altman et al. |
| 5,625,833 A | 4/1997 | Levine et al. |
| 5,632,022 A | 5/1997 | Warren et al. |
| 5,646,650 A | 7/1997 | Miller et al. |
| 5,666,139 A | 9/1997 | Thielens et al. |
| 5,680,480 A | 10/1997 | Beernink et al. |
| 5,680,636 A | 10/1997 | Levine et al. |
| 5,682,439 A | 10/1997 | Beernink et al. |
| 5,687,331 A | 11/1997 | Volk et al. |
| 5,708,825 A | 1/1998 | Sotomayor |
| 5,712,995 A * | 1/1998 | Cohn ......................... 715/792 |
| 5,717,879 A | 2/1998 | Moran et al. |
| 5,727,129 A | 3/1998 | Barrett et al. |
| 5,729,687 A | 3/1998 | Rothrock et al. |
| 5,737,599 A | 4/1998 | Rowe et al. |
| 5,745,116 A | 4/1998 | Pisutha-Arnold |
| 5,760,773 A | 6/1998 | Berman et al. |
| 5,778,404 A | 7/1998 | Capps et al. |
| 5,790,818 A | 8/1998 | Martin |
| 5,801,687 A | 9/1998 | Peterson et al. |
| 5,818,456 A | 10/1998 | Cosman et al. |
| 5,821,925 A | 10/1998 | Carey et al. |
| 5,832,263 A | 11/1998 | Hansen et al. |
| 5,838,914 A | 11/1998 | Carleton et al. |
| 5,845,262 A | 12/1998 | Nozue et al. |
| 5,859,639 A * | 1/1999 | Ebrahim ...................... 715/788 |
| 5,867,593 A * | 2/1999 | Fukuda et al. ............... 382/176 |
| 5,877,757 A | 3/1999 | Baldwin et al. |
| 5,889,523 A | 3/1999 | Wilcox et al. |
| 5,893,126 A | 4/1999 | Drews et al. |
| 5,893,132 A | 4/1999 | Huffman et al. |
| 5,918,236 A | 6/1999 | Wical |
| 5,920,647 A | 7/1999 | Nowlan et al. |
| 5,920,694 A | 7/1999 | Carleton et al. |
| 5,931,912 A | 8/1999 | Wu et al. |
| 5,933,140 A | 8/1999 | Strahorn et al. |
| 5,937,416 A | 8/1999 | Menzel |
| 5,948,040 A | 9/1999 | DeLorme et al. |
| 5,950,214 A | 9/1999 | Rivette et al. |
| 5,953,735 A | 9/1999 | Forcier |
| 5,963,205 A | 10/1999 | Sotomayor |
| 5,978,818 A | 11/1999 | Lin |
| 5,983,248 A | 11/1999 | De Rose et al. |
| 5,986,665 A | 11/1999 | Wrey et al. |
| 6,005,987 A * | 12/1999 | Nakamura et al. .......... 382/294 |
| 6,011,537 A | 1/2000 | Slotznick |
| 6,012,055 A | 1/2000 | Campbell et al. |
| 6,018,334 A | 1/2000 | Eckerberg et al. |
| 6,018,342 A | 1/2000 | Bristor |
| 6,018,742 A | 1/2000 | Herbert, III |
| 6,035,330 A | 3/2000 | Astiz et al. |
| 6,049,812 A | 4/2000 | Bertram et al. |
| 6,052,514 A | 4/2000 | Gill et al. |
| 6,054,990 A | 4/2000 | Tran |
| 6,075,532 A * | 6/2000 | Colleran et al. ............. 345/473 |
| 6,081,829 A | 6/2000 | Sidana |
| 6,088,481 A | 7/2000 | Okamoto et al. |
| 6,091,930 A | 7/2000 | Mortimer et al. |
| 6,094,197 A | 7/2000 | BuXton et al. |
| 6,101,280 A | 8/2000 | Reynolds |
| 6,115,501 A * | 9/2000 | Chun et al. .................. 382/250 |
| 6,118,437 A | 9/2000 | Fleck et al. |
| 6,122,649 A | 9/2000 | Kanerva et al. |
| 6,128,007 A | 10/2000 | Seybold |
| 6,157,381 A | 12/2000 | Bates et al. |
| 6,181,344 B1 | 1/2001 | Tarpenning et al. |
| 6,195,679 B1 | 2/2001 | Bauersfeld et al. |
| 6,195,694 B1 | 2/2001 | Chen et al. |
| 6,199,082 B1 | 3/2001 | Ferrel et al. |
| 6,201,528 B1 | 3/2001 | Lucas et al. |
| 6,205,455 B1 | 3/2001 | Umen et al. |
| 6,230,171 B1 | 5/2001 | Pacifici et al. |
| 6,239,792 B1 | 5/2001 | Yanagisawa et al. |
| 6,262,719 B1 | 7/2001 | Bi et al. |
| 6,271,840 B1 | 8/2001 | Finseth et al. |
| 6,279,005 B1 | 8/2001 | Zellweger |
| 6,279,014 B1 | 8/2001 | Schilit et al. |
| 6,289,362 B1 | 9/2001 | Van Der Meer |
| 6,301,590 B1 | 10/2001 | Siow et al. |
| 6,321,244 B1 | 11/2001 | Liu et al. |
| 6,326,970 B1 * | 12/2001 | Mott et al. ................... 715/517 |
| 6,331,867 B1 | 12/2001 | Eberhard et al. |
| 6,332,039 B1 | 12/2001 | Bando et al. |
| 6,335,727 B1 | 1/2002 | Morishita et al. |
| 6,340,967 B1 | 1/2002 | MaXted |
| 6,356,287 B1 | 3/2002 | Ruberry et al. |
| 6,369,811 B1 | 4/2002 | Graham et al. |
| 6,373,490 B1 | 4/2002 | Bendiksen et al. |
| 6,384,847 B1 | 5/2002 | Rabenhorst |
| 6,389,434 B1 | 5/2002 | Rivette et al. |
| 6,389,437 B2 * | 5/2002 | Stoub ......................... 715/523 |
| 6,392,673 B1 * | 5/2002 | Andrew et al. .............. 715/800 |
| 6,393,422 B1 | 5/2002 | Wone |
| 6,397,233 B1 * | 5/2002 | Okawa et al. ............... 715/530 |
| 6,405,221 B1 | 6/2002 | Levine et al. |
| 6,421,065 B1 | 7/2002 | Walden et al. |
| 6,446,110 B1 | 9/2002 | Lection et al. |
| 6,460,058 B2 | 10/2002 | Koppolu et al. |
| 6,486,895 B1 | 11/2002 | Robertson et al. |
| 6,490,603 B1 | 12/2002 | Keenan et al. |
| 6,529,920 B1 | 3/2003 | Arons et al. |
| 6,535,294 B1 | 3/2003 | Arledge, Jr. et al. |
| 6,539,370 B1 | 3/2003 | Chang et al. |
| 6,549,220 B1 | 4/2003 | Hsu et al. |
| 6,549,675 B2 | 4/2003 | Chatterjee |
| 6,560,621 B2 | 5/2003 | Barile |
| 6,563,503 B1 | 5/2003 | Comair et al. |
| 6,571,295 B1 | 5/2003 | Sidana |
| 6,633,672 B1 | 10/2003 | Guzik et al. |
| 6,642,458 B2 | 11/2003 | Panagrossi III et al. |
| 6,707,473 B2 | 3/2004 | Dresevic et al. |
| 6,720,977 B1 | 4/2004 | Bourdev et al. |
| 6,816,615 B2 | 11/2004 | Lui et al. |
| 2001/0056442 A1 | 12/2001 | Dresevic et al. |
| 2002/0013795 A1 | 1/2002 | Dresevic et al. |
| 2002/0049787 A1 | 4/2002 | Keeley et al. |
| 2002/0049796 A1 | 4/2002 | Dresevic et al. |
| 2002/0097261 A1 | 7/2002 | Gottfurcht et al. |
| 2003/0024748 A1 | 2/2003 | Dresevic et al. |
| 2004/0066378 A1 | 4/2004 | Dresevic et al. |
| 2004/0075657 A1 * | 4/2004 | Chua et al. .................. 345/421 |
| 2004/0155904 A1 | 8/2004 | Dresevic et al. |
| 2004/0234130 A1 | 11/2004 | Lui et al. |

FOREIGN PATENT DOCUMENTS

| | | |
|---|---|---|
| EP | 1016983 A2 | 7/2000 |
| JP | 11327789 | 11/1999 |
| WO | WO 97/22109 | 6/1997 |
| WO | WO 98/06054 | 2/1998 |
| WO | WO 87/01481 | 3/1998 |
| WO | WO 98/09446 | 3/1998 |
| WO | WO 99/49383 | 9/1999 |

OTHER PUBLICATIONS

U.S. Appl. No. 10/972,390, filed Oct. 26, 2004, Dresevic et al.
Bill N. Schilit et al., "Digital Library Information Appliances", pp. 217-225, 1998.
Microsoft® Windows Graphical Environment for Pen Computing SDK, Guide to Pen Programming, Aug. 2, 1991.

Microsoft Windows Graphical Environment for Pen Computing—Introduction to Microsoft Windows for Pen Computing, pp. 1-13.
Internet Printout: About Interchange File Format, http://www.borg.com, dated May 10, 2001.
Internet Printout: http://www.borg.com, Opening a RIFF file for reading or writing, dated May 10, 2001.
Internet Printout: http://ccrma-www.stanford.edu, WAVE PCM soundfile format, dated May 10, 2001.
"EA IFF 85" Standard for Interchange Format Files.
Internet Printout: http://www.daubnet.com/formats/RIFF.html, Resource Interchange Format, dated May 10, 2001.
Internet Printout: http://burks.brighton.ac.uk/burks/foldoc/32/57.htm, Interchange File Format, dated May 10, 2001.
Internet Printout: http://www.faqs.org/faqs/graphics/fileformats-faq/part1/preamble.html, Graphics File Formats FAQ (Part 1 of 4): General Graphics Format Questions, dated May 10, 2001.
Internet Printout: http://www.faqs.org/faqs/graphics/fileformats-faq/part2/preamble.html, Graphics File Formats FAQ (Part 2 or 4): Image Conversion and Display Programs, dated May 10, 2001.
Internet Printout: http://www.faqs.org/faqs/graphics/fileformats-faq/part3/preamble.html, Graphics File Formats FAQ (Part 3 of 4): Where to Get File Format Specifications, dated May 10, 2001.
Internet Printout: http://www.faqs/graphics/fileformats-faq/part4/preamble.html, Graphics File Formats FAQ (Part 4 of 4): Tips and Tricks of the Trade, dated May 10, 2001.
Internet Printout: http://msdn.microsoft.com/library/psdk/multimed/mmio, Resource Interchange File Format Services, dated May 10, 2001.
Internet Printout: http://n.ethz.ch/student/hhug/simpl/doc/iff_h-source.html, iff.h, dated May 10, 2001.
Internet Printout: http://www.cica.indiana.edu/graphics/image.formats.html, Center for Innovative Computer Applications, dated May 10, 2001.
Internet Printout: http://www.timestream.com/mmedia/making/hiff1.html, HIFF Format Specification, dated May 10, 2001.
Graphics Interchange Format (sm), Version 89a, 1990, CompuServe Incorporated.
EP Search Report dated Jul. 8, 2004.
JOT—A Specification for an Ink Storage and Interchange Format, 1996.
Aref et al., "The Handwritten Trie: Indexing Electronic Ink," SIGMOD '95, 1995, pp. 151-162.
Aref et al., "On Handling Electronic Ink", ACM Computing Surveys, vol. 27, No. 4, Dec. 1995, pp. 564-567.
Uchihashi et al., "Automatic Index Creation for Handwritten Notes," IEEE Int. Conf. on Acoustics, Speech, and Signal Processing, vol. 6, Mar. 15, 1999, pp. 3453-3456.
James D. Foley, et al., "Computer Graphics: Principles and Practices", 2nd Edition, 1990, pp. 835-840.
Gerald E. Farin, "Curves and Surfaces for Computer Aided Geometric Design a Practical Guide", 2nd Edition, 1990, pp. 37-41.
Angelfire Webpage, "Curve Fitting and the Method of Least Squares", http://www.angelfire.com/ak4/neurope/ls.html, printed Jul. 6, 2001, 13 pages.
John D. Hobby, "Rasterizing Curves of Constant Width", Journal of the Association for Computing Machinery, vol. 36, No. 2, Apr. 1989, pp. 209-229.
Aha! InkWriterJ The simplicity of pen and paper, the power of word processing., Advertisement, 1993, 2 pp., aha! software corporation, Mountain View, CA.
Aha! InkWriterJ for Magic Cap "The fastest, most convenient way to create faxes, notes and messages." Advertisement, 1993, 1994, 2 pp., aha! software corporation, Mountain View, CA.
Aha! 2.0 for Windows InkWriterJ The power of word processing, the convenience of pen and paper, Advertisement, 1994, 1995, 2 pp., aha! software corporation, Mountain View, CA.
Aha! software products, Web Page List of Products, Sep. 24, 1997, pp. 1-5, aha! software corporation, Mountain View, CA.
"Adobe Acrobat 3.0 Reader Online Guide", Adobe Systems, Inc., pp. 1-110.
Open eBook Forum, Open eBook™ Publication Structure 1.0, Sep. 1999 http://www.ebxwg.org/oebps/oebps1.0/download/oeb1-oebps.htm.
Kristensen, A., "Formsheets and the XML Forms Language" (Mar. 1999).
Dublin Core Resource Types: Structurality DRAFT: Jul. 24, 1997, Feb. 27, 1998.
Dublin Core Metadata Element Set, Version 1.1: Reference Description; 1999.
Dublin Core Metadata Initiative: User Guide Working Draft Jul. 31, 1998; 1999.
SOFTBOOK® Press, The Leader in Internet-Enabled Document Distribution and Reading Systems; 1999 http://www.softbook.com/consumer/reader.asp.
Rocket eBook Using the Rocket eBook, 1999; http://www.rocketbook.com/Products/Faq/using.html.
Explore the Features of the Rocket eBook; wysiwyg://212http://www.rocketbook.com/Products/Tour/index.html; publication date unknown, prior to filing application.
Computer Networks and ISDN Systems "Responsive interaction for a large Web application: the meteror shower architecture in the WebWriter II Editor"; 1997; pp. 1508-1517.
Hirotsu et al., "Cmew/U—A Multimedia Web Annotation Sharing System", NTT Network Innovation Laboratories—Japan, IEEE, 1999, pp. 356-359.
Kuo et al., "A Synchronization Scheme for Multimedia Annotation", Multimedia Information Networking Laboratory, Tamkang University—Taiwan, IEEE, 1997, pp. 594-598.
QuickTime, Inside Macintosh: QuickTime Reference, 1999, http://developer.apple.com/documentation/QuickTime/REF/refVectors.1.htm.
W3C, XML Schema Part 1: Structures, 1999, http://www.w3.org/TR/1999/WD-xmlschema-1-19991217/.
Hamilton, Eric, JPEG File Interchange Format Version 1.02, Sep. 1, 1992, http://www.w3.org/Graphics/JPEG/jfif3.pdf.
Baxes, Gregory A., Digital Image Processing, 1994, John Wiley & Sons, Inc., ISBN 0-471-00949-0.

* cited by examiner

SYSTEM AND METHOD FOR SCALING AND REPOSITIONING DRAWINGS

TECHNICAL FIELD

The present invention relates to the electronic manipulation of text and drawing images. More specifically, the present invention relates to computer systems in which electronic documents containing text and drawing images may be edited and to novel processes for editing such documents.

BACKGROUND OF THE INVENTION

Perhaps one of the most valuable contributions made by computers today lies in their ability to electronically create and manipulate documents. A task that previously required manual typewriters, correction tape, and carbon copies can now be accomplished in electronic format, with minimal wasted time and resources. Although discarded typewriter ribbons, carbon sheets, and paper rough drafts are now safely a thing of the past, modern innovations in word processing computers and systems continue to improve efficiency.

One such improvement is the ability to incorporate drawing images as part of an electronic text document, and is offered in one form or another by a variety of word processing programs, such as MICROSOFT WORD®. For example, FIG. 1 illustrates an onscreen page 101 of a typical word processing program, in which text 103 and drawings 105 may coexist. Typical word processing programs also permit users to create text using different typeface fonts and/or sizes. Accordingly, it is possible for a user to change text 103 to a larger font, shown in FIG. 2. Also shown in FIG. 2, however, is the fact that upon increasing the font size, there is no longer enough room on the page for the drawing images 105. The drawing images 105 are, therefore, moved to the next page in the electronic document, leaving a space 201 on the current page. This space 201, however, is often confusing to the user. If the user were to enter data in space 201, it remains unclear as to where the data would appear, as it might be inserted into the document before, or after, the drawing images 105.

Additionally, in typical word processing programs, changing the font size does not change the size of a drawing image. The user who resized the text, for example, to make a document more readable with larger letters typically would also desire a corresponding enlargement to drawing images as well. With the typical word processing program, the user would have to undertake a second step of selecting and resizing each drawing image in the document. Accordingly, there is a need for an improved word processing system that can automatically resize drawing images in a document, responsive to a change in font size in the document.

This need extends to any device capable of editing or manipulating electronic text or drawings, such as personal data assistants (PDAs), portable computers, cellular telephones, etc. For example, the personal computer (PC) device shown in FIG. 4 may process electronic text and/or drawings, and may be a pen-based computing device. FIG. 5 depicts an example page 501 of a document that may be shown, for example, on the FIG. 4 device. Page 501 may include one or more lines 503, for example, to assist users in aligning handwritten text, and may also include one or more drawing images 507. The device permits users to redefine the line height for lines 503, and as discussed above with regard to changing font sizes, it is desirable for drawing images 507 to be resized according to changes in line height.

SUMMARY OF THE INVENTION

According to the present invention, a novel system and/or method is provided for resizing and/or repositioning one or more drawing images in a document responsive to a change in textual font or line height or line size of the document.

The electronic document may be separated logically into a number of horizontally-adjacent regions, each region having its own reference axis. Drawing images and text may be distinguished from one another. A region in which the drawing is said to primarily exist may be identified, and the drawing may be anchored to the reference axis for that particular region.

A drawing itself may have one or more reference points for the anchoring process. The present invention further provides a method for determining such a reference point.

When a line height or font is changed, the drawings may first be resized in proportion to the change in line height. An offset from a drawing to the reference axis of the drawing's region may also be scaled, and the resized drawings may be repositioned in accordance with the scaled reference axis offset.

The system may determine whether the resized and/or repositioned drawings will fit in the allowed page width. If the drawings will not fit, then one or more of the drawings may be repositioned in order to avoid overlap, and the drawings may be resized to fit the allowed page width.

Further, the repositioned drawings may be partially displayed on a page, and may also provide indicators to inform the user that the repositioned drawing continues on another page.

Newly-added drawings may be compared with existing drawings, and may be combined as a single drawing for purposes of anchoring, resizing, and/or repositioning.

Additional features and aspects of the present invention are found in the following descriptions and the drawings.

DETAILED DESCRIPTION OF EMBODIMENTS OF THE INVENTION

Figure 1:
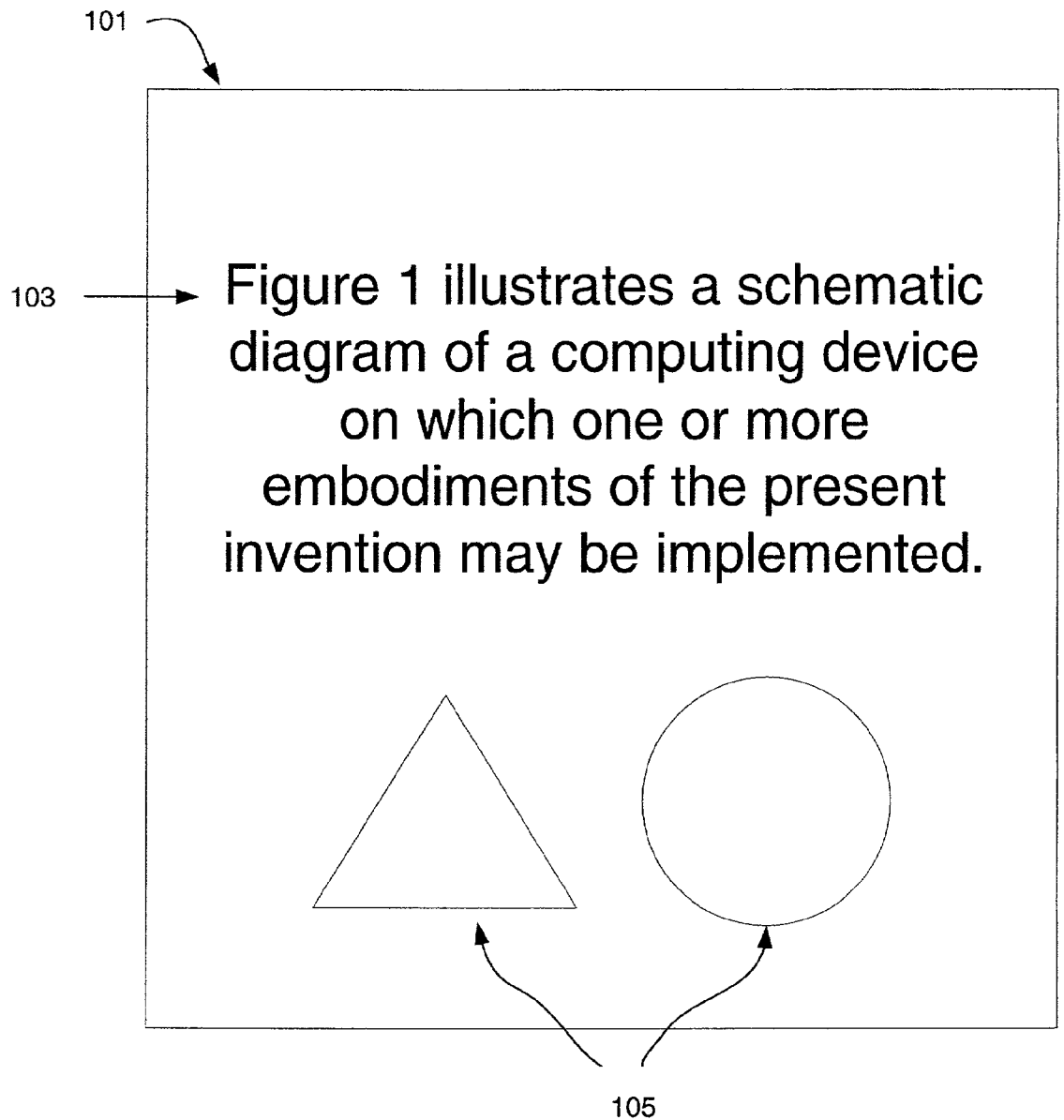
FIGS. 1–2 illustrate behavior in typical prior art word processing programs when font size is changed.
Figure 2:
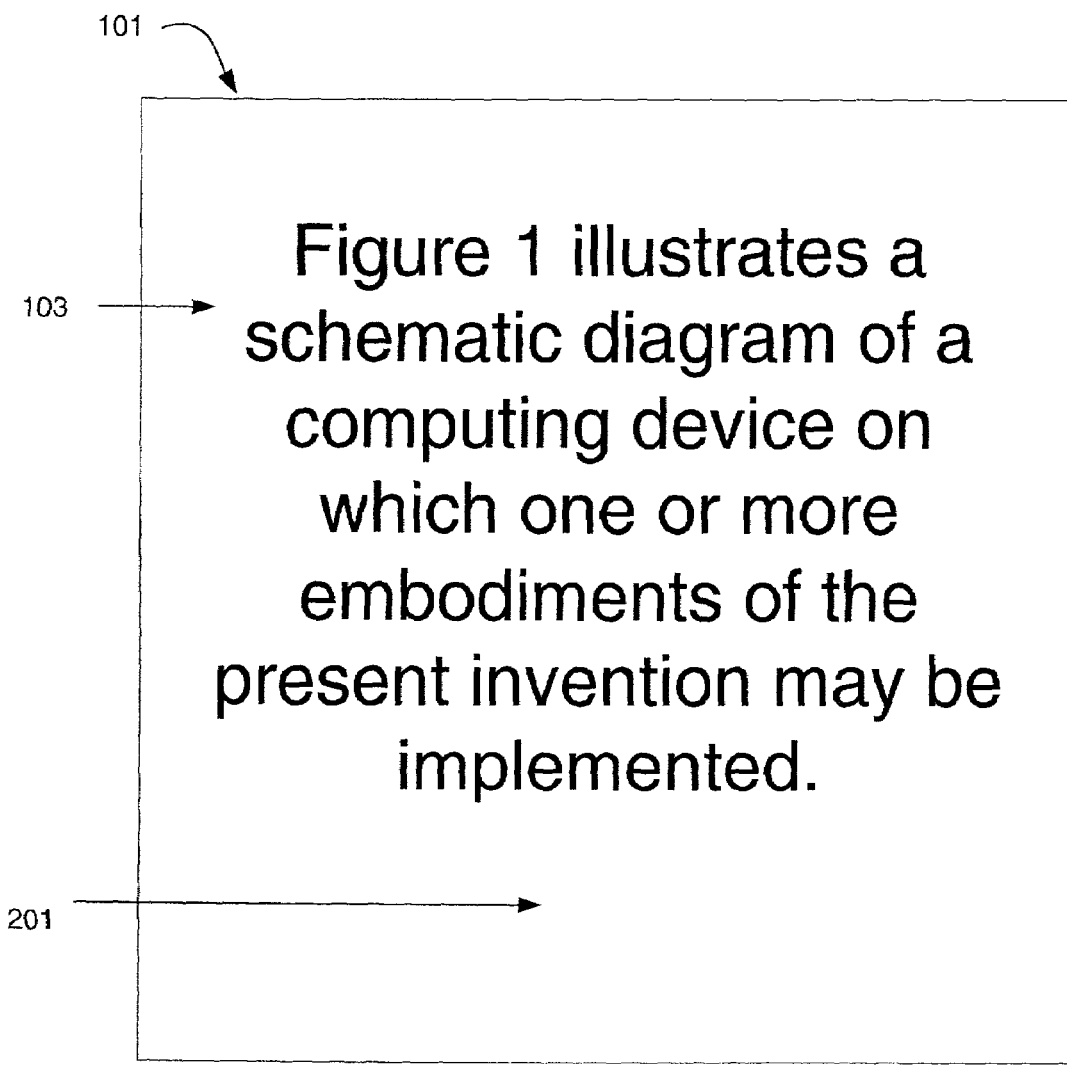
Figure 3:
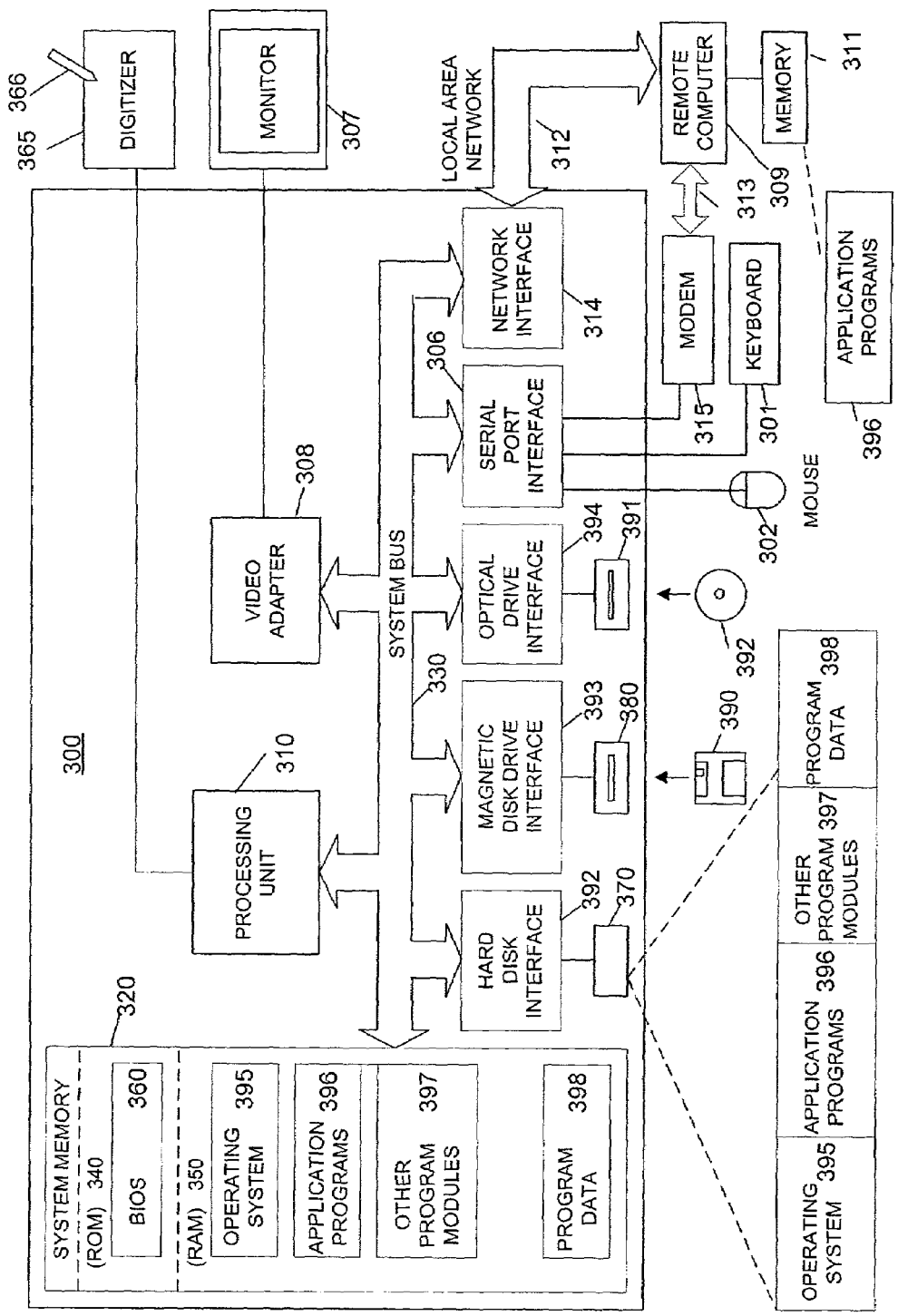
FIG. 3 illustrates a schematic diagram of a computing device on which one or more embodiments of the present invention may be implemented.

The present invention may be more readily described with reference to FIGS. 3–12. FIG. 3 illustrates a schematic diagram of a conventional general-purpose digital computing environment that can be used to implement various aspects of the present invention. A computer 300 may include one or more processing units 310, system memory 320 (RAM 350 and/or ROM 340), system bus 330, and basic input/output system 360 (BIOS). The computer 100 also includes a hard disk drive 370 for reading from and writing to a hard disk (not shown), a magnetic disk drive 380 for reading from or writing to a removable magnetic disk 390, and an optical disk drive 391 for reading from or writing to a removable optical disk 392 such as a CD ROM or other optical media. The hard disk drive 370, magnetic disk drive 380, and optical disk drive 391 are connected to the system bus 330 by a hard disk drive interface 392, a magnetic disk drive interface 393, and an optical disk drive interface 394, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

Computer 300 may include a number of program modules, such as an operating system 395, one or more application programs 396, other program modules 397, and program data 398, that may be stored in memory such as on RAM 350 or hard disk 370. A user can enter commands and information into the computer 300 through input devices such as a keyboard 301 and pointing device 302, which are coupled to the system bus 330 via a serial portion interface 306. Other input devices (not shown) may include a microphone, joystick, game pad, satellite dish, scanner or the like. Computer 300 may also include one or more display monitors 307 coupled to the system bus 330 via video adapter 308, other types of display device, or other forms of output device, such as speakers and printers. For example, a pen digitizer 365 and accompanying pen or stylus 366 may be provided in order to digitally capture freehand input. The digitizer 365 may be coupled to the system bus 330 via the processing unit 310. The digitizer 365 may be integrated in the monitor 307, or may exist as a separate device overlaying or otherwise appended to the monitor 307.

The computer 300 can operate in a networked environment using logical connections to one or more remote computers, such as a remote computer 309 having memory 311 for storing application programs 396, and may operate as part of a local area network (LAN) 312 and/or wide area network (WAN).

When used in a LAN networking environment, the computer 300 is connected to the local area network 312 through a network interface or adapter 314. When used in a WAN networking environment, the personal computer 300 typically includes a modem 315 or other means for establishing a communications over the wide area network 313, such as the Internet. The modem 315, which may be internal or external, is connected to the system bus 330 via the serial port interface 1306. In a networked environment, program modules depicted relative to the personal computer 100, or portions thereof, may be stored in the remote memory storage device.

Although the FIG. 3 environment shows an exemplary environment, it will be understood that other computing environments may also be used. For example, one or more embodiments of the present invention may use an environment having fewer than all of the various aspects shown in FIG. 3 and described above, and these aspects may appear in various combinations and sub-combinations that will be apparent to one of ordinary skill.

Figure 4:
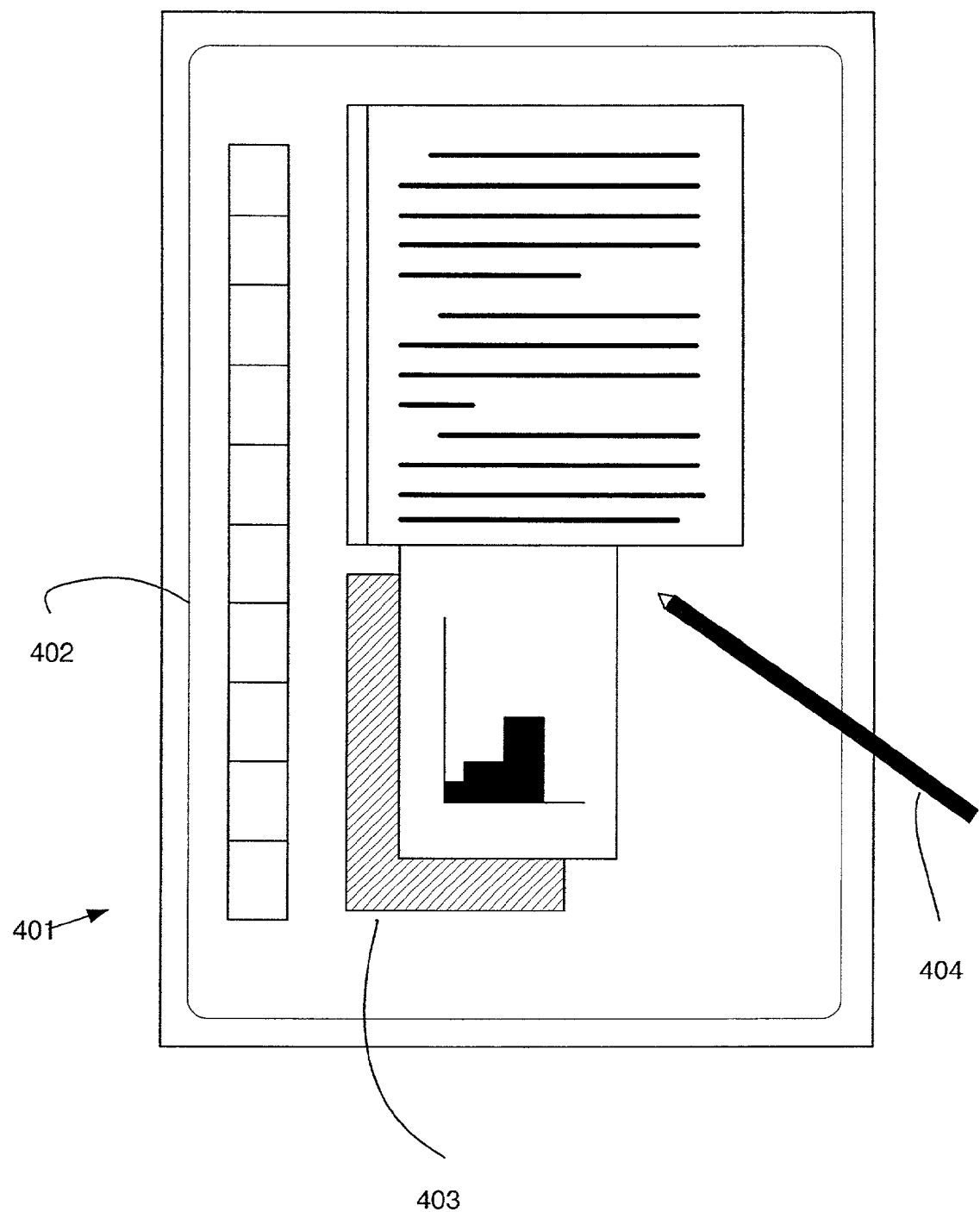
FIG. 4 illustrates a personal computer device on which one or more embodiments of the present invention may be implemented.
Figure 5:
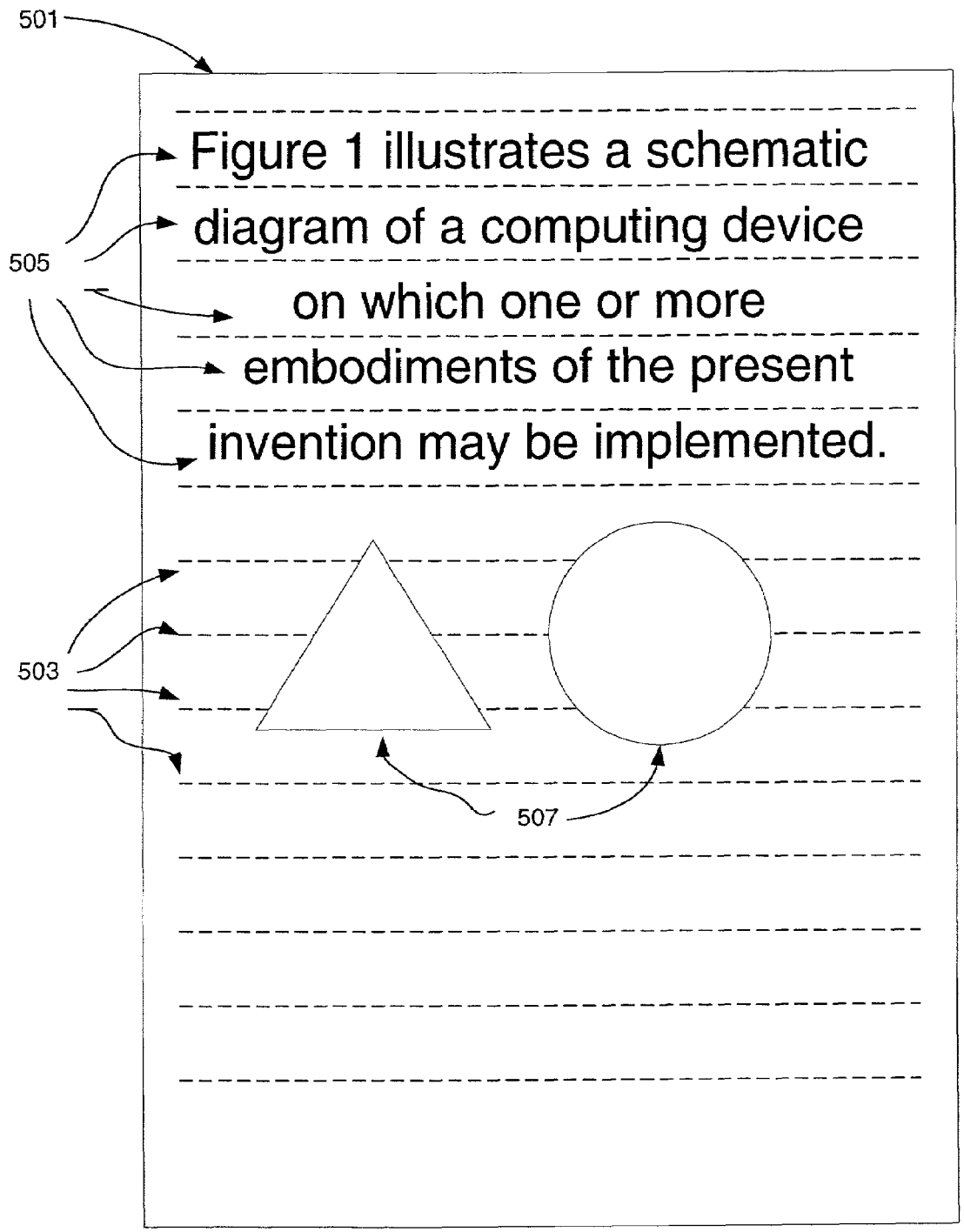
FIG. 5 illustrates an example display area, such as on a pen-based computer device, on which one or more embodiments of the present invention may be implemented.

FIG. 4 illustrates a device 401, such as a pen-based computing device, that can be used in accordance with various aspects of the present invention. Any or all of the features, subsystems, and functions in the system of FIG. 3 can be included in the computer of FIG. 4. Device 401 includes a large display surface 402 that is preferably a digitizing flat panel display, such as a liquid crystal display (LCD) screen, on which a plurality of windows 403 is displayed. Using stylus 404, a user can select, highlight, and write on the digitizing display 402. Examples of suitable digitizing flat panel displays include electromagnetic pen digitizers, such as the Mutoh or Wacom pen digitizers. Other types of pen digitizers, for example, optical digitizers, may also be used. Device 401 interprets marks made using stylus 404 in order to manipulate data, enter text, and execute conventional computer application tasks such as spreadsheets, word processing programs, and the like.

Stylus 404 may be equipped with buttons or other mechanisms to augment its selection capabilities. In one embodiment, stylus 404 can be implemented as a simple rigid (or semi-rigid) stylus. Alternatively, stylus 404 may be provided in the form of a pencil or pen may include one end that constitutes a writing portion, and another end that constitutes an eraser end which, when moved across the display, indicates that portions of the display are to be erased. Other types of input devices such as a mouse, trackball, or the like could be used in place of, or in conjunction with, stylus 404. Additionally, a user's own finger could be used to select or indicate portions of the displayed image on a touch-sensitive or proximity-sensitive display. Consequently, the term "user input device" is intended to have a broad definition and encompasses many variations on well-known input devices. In alternate embodiments, inputs may be received using other devices, such as a mouse, track-ball, light pen, keyboard keys, etc.

As noted above, FIG. 5 illustrates an example document page display on which one or more embodiments of the present invention may be realized. The FIG. 5 display may appear on the display of the device shown in FIG. 4, and may be displayed on a digitizing display such that the user may write text and/or draw images using, for example, a stylus. To assist the user in aligning such handwritten text, one or more lines 503 may also be displayed. The FIG. 5 example shows a portion of text 505, some or all of which may be handwritten, and several drawing images 507 as well.

Figure 6:
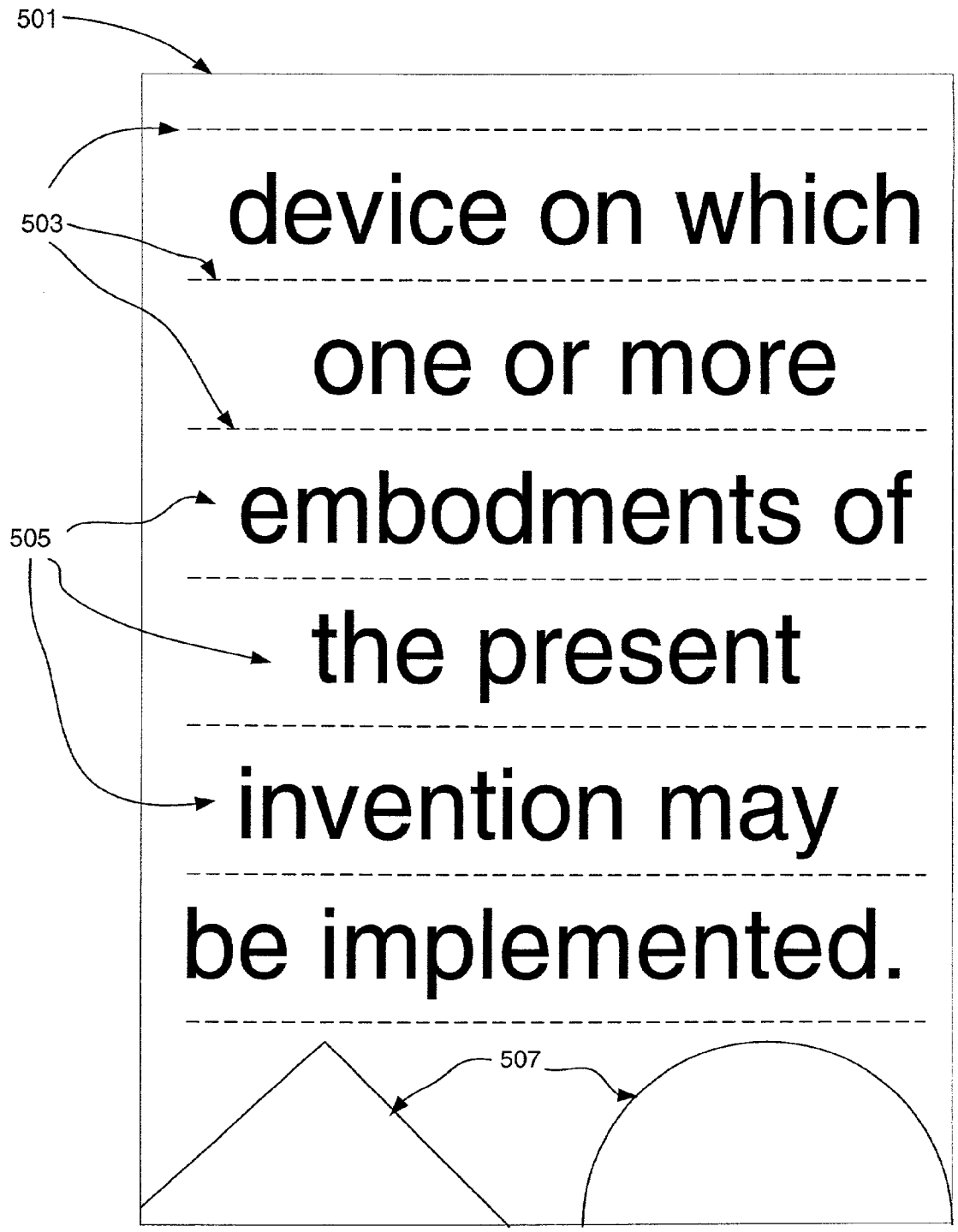
FIG. 6 illustrates the display area shown in FIG. 3, with a resized line height.

As shown in FIG. 6, it is possible for a user to redefine the line height (or line size) for lines 503. Changing line height/size may be desirable, for example, if the user wishes to enlarge or reduce displayed text and/or images, and retain the lines 503 for additional editing. The line height, or distance between lines 503, in the FIG. 6 example display is twice as large as that shown in FIG. 5, and consequently, the text 505 is also enlarged. The drawings 507 are also shown to be enlarged, and partially displayed at the bottom of the area 501. The unique and novel manner in which the drawings 507 are resized and/or repositioned responsive to a change in line height is described below.

Figure 7:
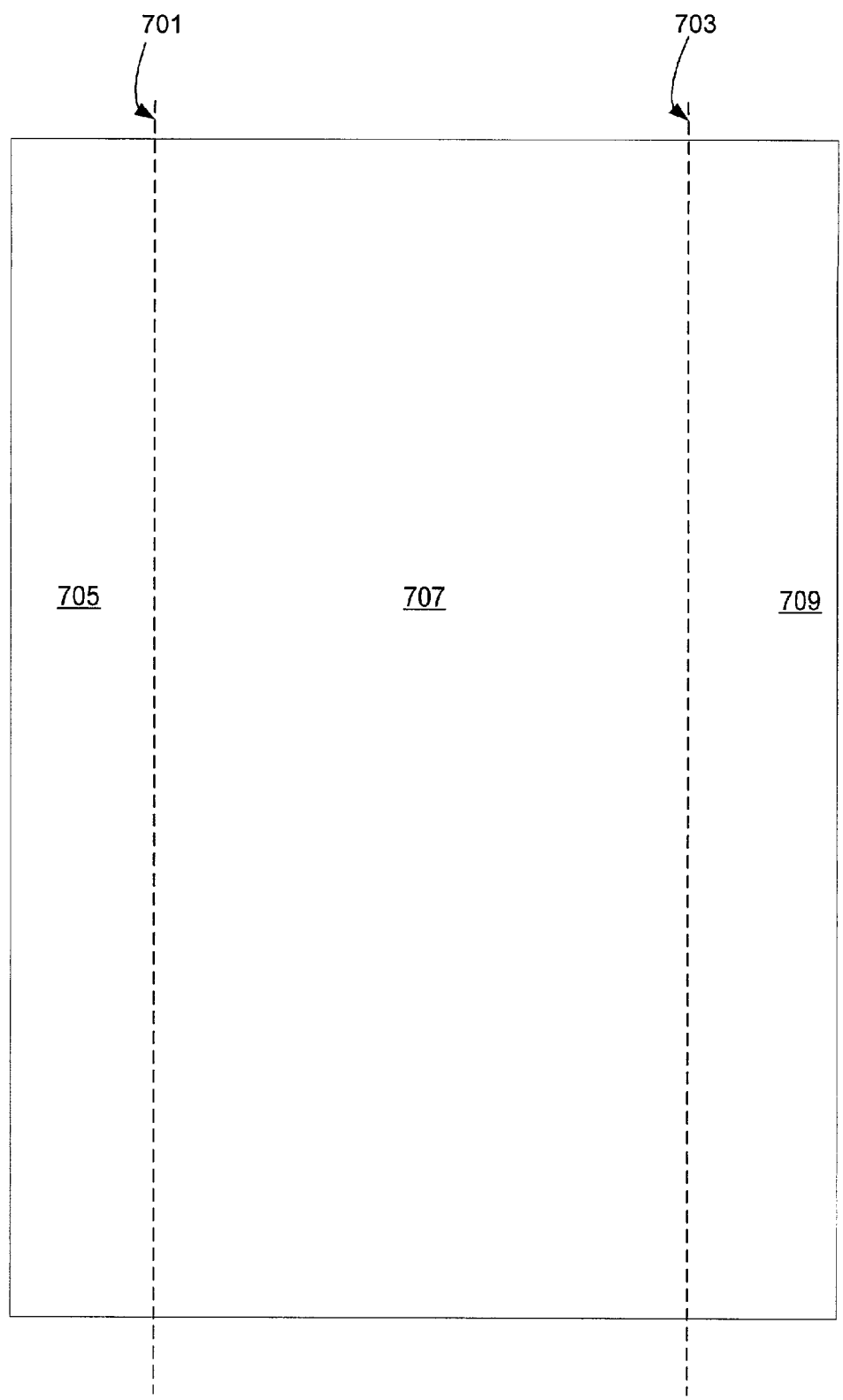
FIG. 7 illustrates an example of a document having logically-defined regions according to one embodiment of the present invention.

Various aspects discussed below refer to regions of a document, and some background information regarding these regions and drawings may be helpful. The resizing and/or repositioning of the drawings refer to horizontally-adjacent regions in the electronic document, although the same teachings are applicable to vertically-adjacent regions. These regions are simply a logical construct used to handle the document, and may be identified by dividing the width of the document into a number of sections. FIG. 7 shows an example of such a logical division. In FIG. 7, logical divisions 701 and 703 divide the document into three horizontally-adjacent regions 705, 707 and 709. Although three regions are used in the FIG. 7 embodiment, any number of regions may be used without departing from the scope of the present disclosure, with a greater number of regions providing a greater degree of refinement in resizing/repositioning, but increasing the amount of required processing. In the FIG. 7 example, the three regions correspond to the left margin (region 705), the body (region 707) and the right margin (region 709).

Figure 8:
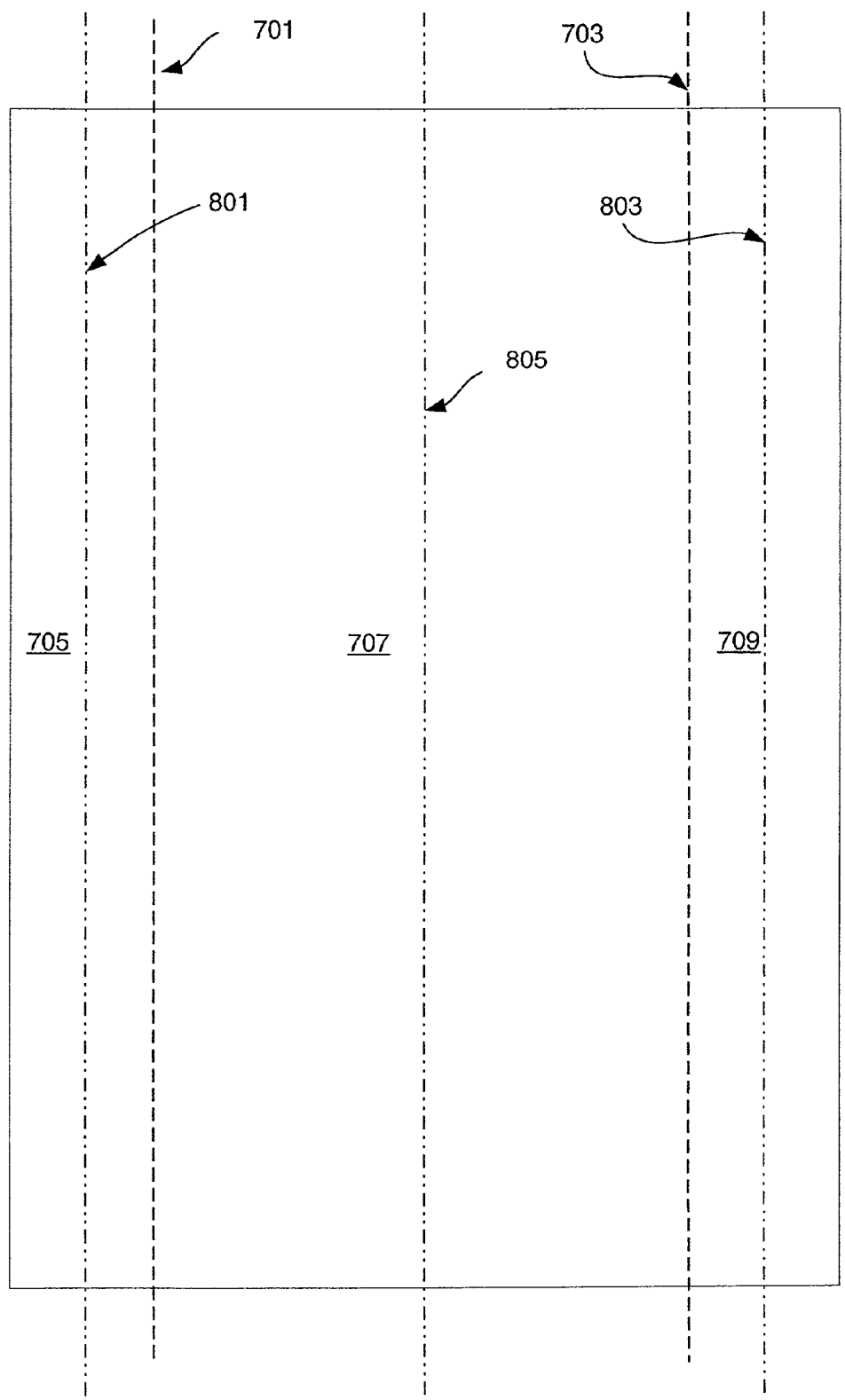
FIG. 8 illustrates the display area shown in FIG. 5, with reference axes for the logically-defined regions.

The various logical regions may be used to handle the horizontal placement and/or resizing of various drawings. Each region may be provided with a reference axis that may serve as a point of reference for drawings appearing in each particular region. For example, the regions 705, 707, 709 are shown in FIG. 8 to have reference axes 801, 803, 805 that are vertically arranged in the center of each respective region. The reference axes 801, 803, 805 provide a point of reference that may be used to identify locations of drawings within each region by indicating a drawing's horizontal offset from the reference axis for the region in which the drawing is located. For example, a drawing located in the body (region 707) of a document might be identified as being horizontally located 200 pixels to the left of the reference axis 805 in region 707.

Although the FIG. 8 reference axes 801, 803, 805 are shown as being in the horizontal center of their respective regions, other points of reference may be used. For example, the various regions 705, 707, 709 may simply have a reference axis at the left-most position within each region. In such an alternate embodiment, the horizontal offset for a drawing may simply be the distance (for example, in any form of linear measurement, such as pixels, inches, centimeters, etc.) between the drawing and the axis for the region in which the drawing is said to exist. Alternatively, the reference axis may be the rightmost position of each region. As another example, a single reference point may be defined for the regions, such as the lower-left corner of the region on a page, with the offset being X- and Y-coordinate distances from this point. Any point or axis of reference may be used, provided it sufficiently identifies a positional location of the drawing.

Although horizontally-adjacent regions are discussed above, various aspects of the present invention may also be applied using vertically-adjacent regions of the document. Use of vertically-adjacent regions may be beneficial where, for example, vertical lines are used within the language (such as the Chinese language). In such languages, resizing a line width may (or column width) be equivalent to resizing a line height in English-speaking systems, and the rescaling and/or repositioning of drawings responsive to a change in line width may be performed using the same approach discussed herein.

Figure 9:
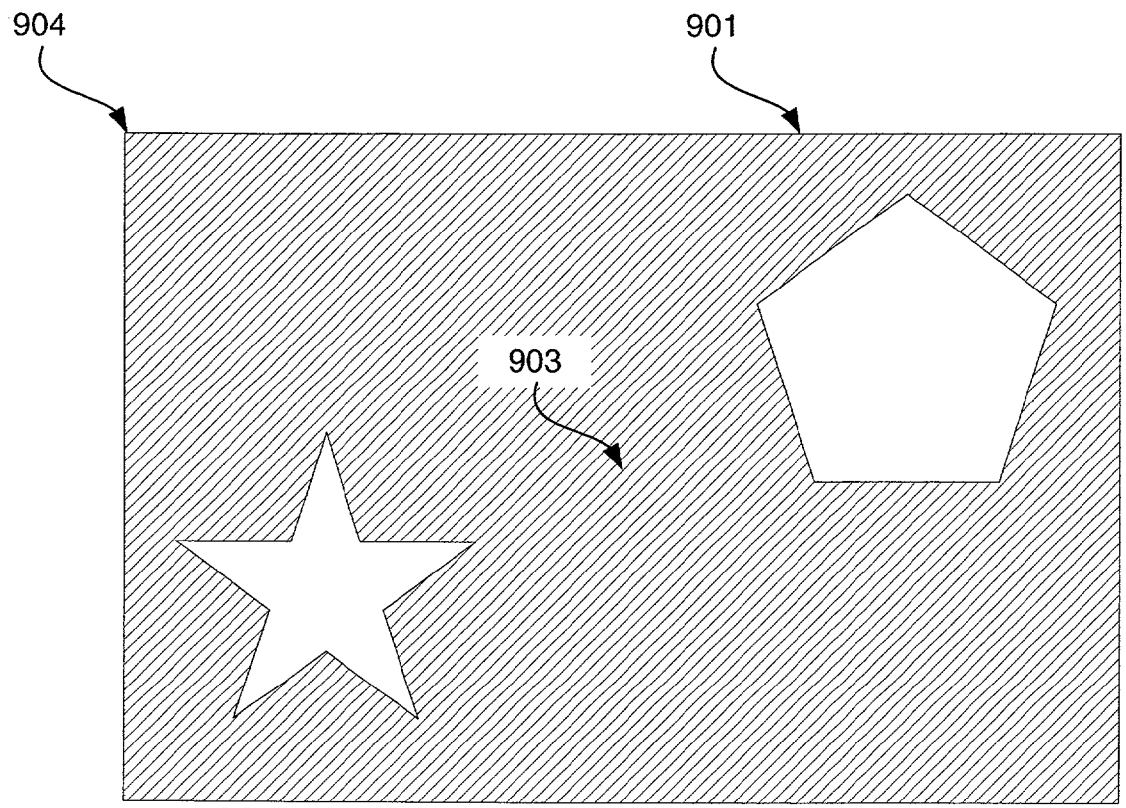
FIG. 9 illustrates an example drawing that may be modified using one or more embodiments of the present invention.

When measuring or referencing the position of a drawing, or measuring a distance from the drawing to a reference axis, it is beneficial to define a point of reference, or "anchor point," of the drawing. For example, FIG. 9 shows a drawing 901 that might appear in a document. To precisely measure its location, anchor point 903 may be used to represent a location of the drawing, and to make the necessary measurements. The anchor point may be the center 903 of the drawing, a corner 905 of the drawing, a rightmost or leftmost edge of a drawing, or any other known reference point of the drawing used to represent a location of the drawing. In some embodiments, a drawing's horizontal offset value may be a distance between the drawing's anchor point and a reference axis of a region in the document, and the drawing may be considered to be "anchored" to that particular document region. Data representing a drawing may be based on the drawing's anchor point, such that the drawing may be created and displayed once the anchor point is known. For example, the data representing a drawing may be a series of coordinates and/or vectors relative to the anchor point (which may serve as the origin for the coordinates or vectors).

Because drawings are typically larger than a single pixel, they may in fact appear across more than one region in a document. There are many ways to determine the region in which such a drawing is "anchored." In some situations, a drawing may be anchored in whatever region contains the horizontal midpoint of the drawing. This may be determined by simply identifying the leftmost and rightmost points in the drawing, and picking the point in between. In other situations, a weighted approach may be used to assign the drawing to a region. For example, the drawing might be anchored in whatever region contains the largest portion of the drawing. Since the drawing's horizontal offset values may be measured between the drawing's anchor point and the region's reference axis (or point), a wide variety of methods may be used to assign a drawing to a particular region. Whichever approach is used, the present invention may "anchor" drawings to a particular document region by identifying and/or storing the horizontal offset values between the drawing (or its reference point) and the region's reference axis (or point).

Figure 10:
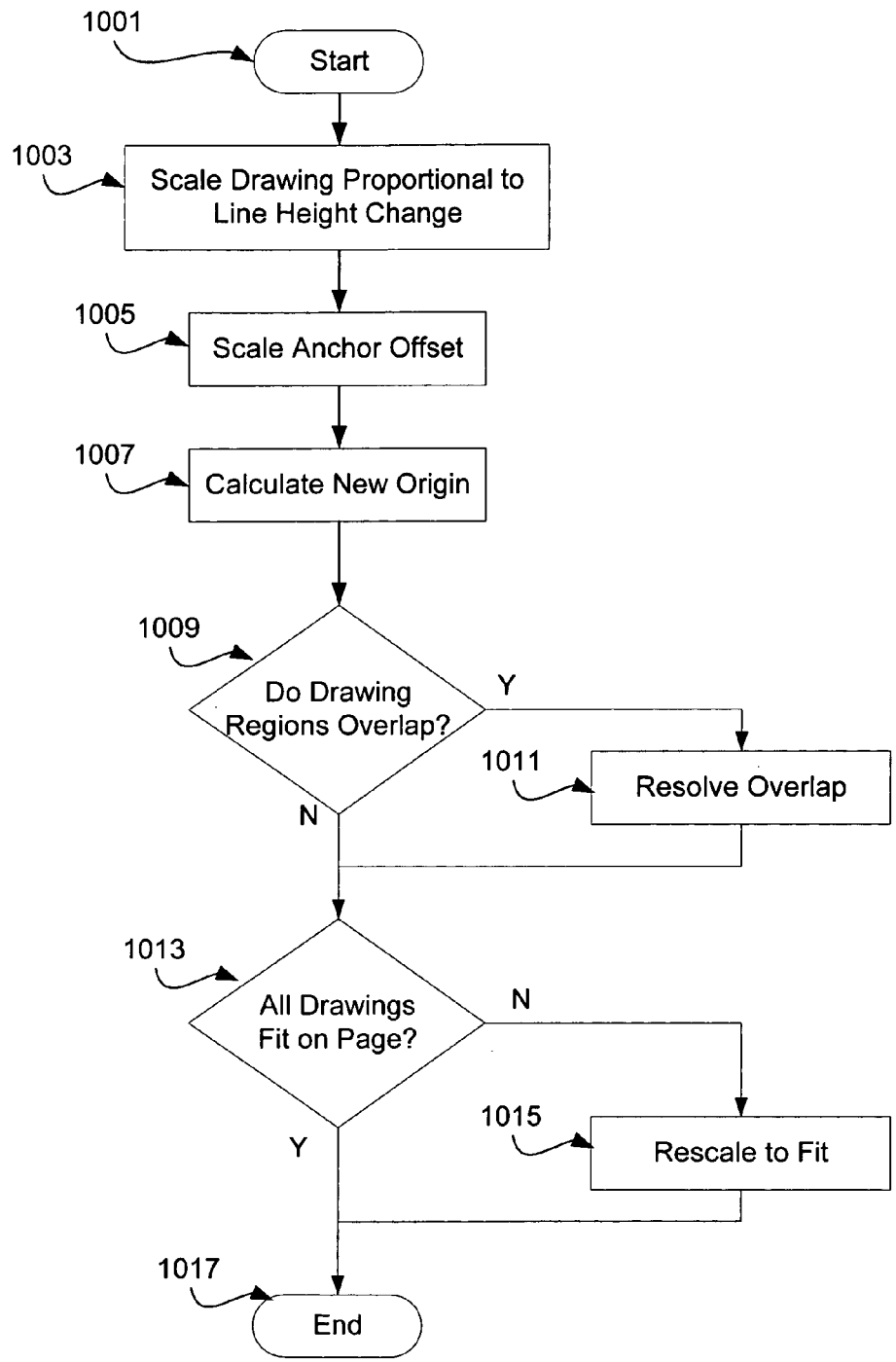
FIG. 10 illustrates an example process in one embodiment of the present invention.

With this background, the process shown in FIG. 10 will now be discussed. In the process, which begins at step 1001, one or more drawings may be resized and/or relocated responsive to a change in line height or font size in the text portion of a document. After starting, the process may move to step 1003, in which the drawings are resized in proportion to the change in line height. The proportion may be a one-to-one proportion, meaning, for example, that a doubling in the line height will cause a doubling of the height and width of the drawing. Alternatively, the proportion might not be a one-to-one proportion, and may be adjusted as desired. For example, the drawings may be adjusted to a lesser degree (e.g., a doubling of the line height results in a less-than-doubled drawing height and/or width), while other embodiments may adjust drawings to a greater degree (e.g., doubling the line height more than doubles the drawing height and/or width). The area of a drawing may be adjusted in proportion to the change in line height. For example, a doubling in line height may simply result in a doubling of the area of the drawing. Again, the precise proportion will depend on the particular implementation desired, and may be defined by the user. Alternatively, the proportion may be dynamically adjusted such that a drawing may be enlarged until its width (or height) is at a maximum allowable amount (such as a predefined page width or height), with no more resizing beyond that point.

In step 1005, the horizontal offset values may also be rescaled according to the change in line height. As with step 1003, this rescaling of the horizontal offset value may also be proportional, such as a one-to-one proportion. However, the rescaling of the offset value need not be in one-to-one proportion, and can vary as desired. As an example, a drawing that was previously located 300 pixels to the right of a particular reference axis might have its horizontal offset value adjusted so that it is 600 pixels to the right of the axis, if the line height was doubled.

In step 1007, the rescaled drawings are repositioned according to the rescaled horizontal offset values. For example, in some situations, if a drawing's horizontal offset value were changed from 300 pixels to 600 pixels, the rescaled drawing may be repositioned such that the drawing's anchor point is now located 600 pixels away from the reference axis, as opposed to the previous offset of 300 pixels. Then, in step 1009, a check is made to determine whether two or more repositioned drawings now overlap one another. This check may be made, for example, by comparing the x- and y-coordinates of the respective drawing regions to determine if any portion of the drawings occupy the same point or pixel. Overlap may also be determined for square or rectangular drawing regions using a comparison of maximum and minimum x- and y-coordinates.

If two or more drawings do overlap, the process may move to step 1011. In step 1011, the overlapping drawings may be returned to their original sizes, and subsequently rescaled as a single drawing until a maximum width, such as a page width, is reached. By rescaling as a single drawing, the overlapping drawings, and the horizontal space between, may be proportionally rescaled as described above. The drawings may also be rescaled vertically in the same proportion, to preserve their aspect ratio. This process of resolving overlaps also preserves the relative distances between the drawings, giving meaning to the horizontal space between the drawings. If, however, horizontal space between drawings can be fairly ignored, then step 1011 may resolve the overlap by rescaling the drawings to reduce their size until the overlap no longer exists, or a predefined distance (such as 1, 10, 100, etc. pixels) of space exists between the drawings.

Once the overlap is resolved, or if no overlap existed in step 1009, a check may be made in step 1013 to determine whether the newly-arranged drawings would still fit within the allowed page width. This allowed page width may be the full width of the document page, or some other predefined width, such as between margins. If the repositioned drawings do not fit within the allowed width, then in step 1015, the repositioned drawings are all equally reduced in size until they do fit. If, in step 1013, the repositioned drawings already fit in the allowed width, then the process ends in step 1017.

The discussion herein refers to various rescaling and repositioning of drawings. It will be understood that such functions do not require that the rescaled and/or repositioned drawings be displayed onscreen. In the discussion of FIG. 10, the newly rescaled and/or repositioned drawings need not be displayed onscreen until the FIG. 10 process is complete. The intermediate rescaled and/or repositioned drawings may simply be processed logically by the computing device. Additionally, the various drawings may be retained in memory in a variety of formats (e.g., as scalar and/or vector data, linked lists, trees, or any other data structure), which may dictate or affect how the processes described herein are carried out.

Figure 11A:
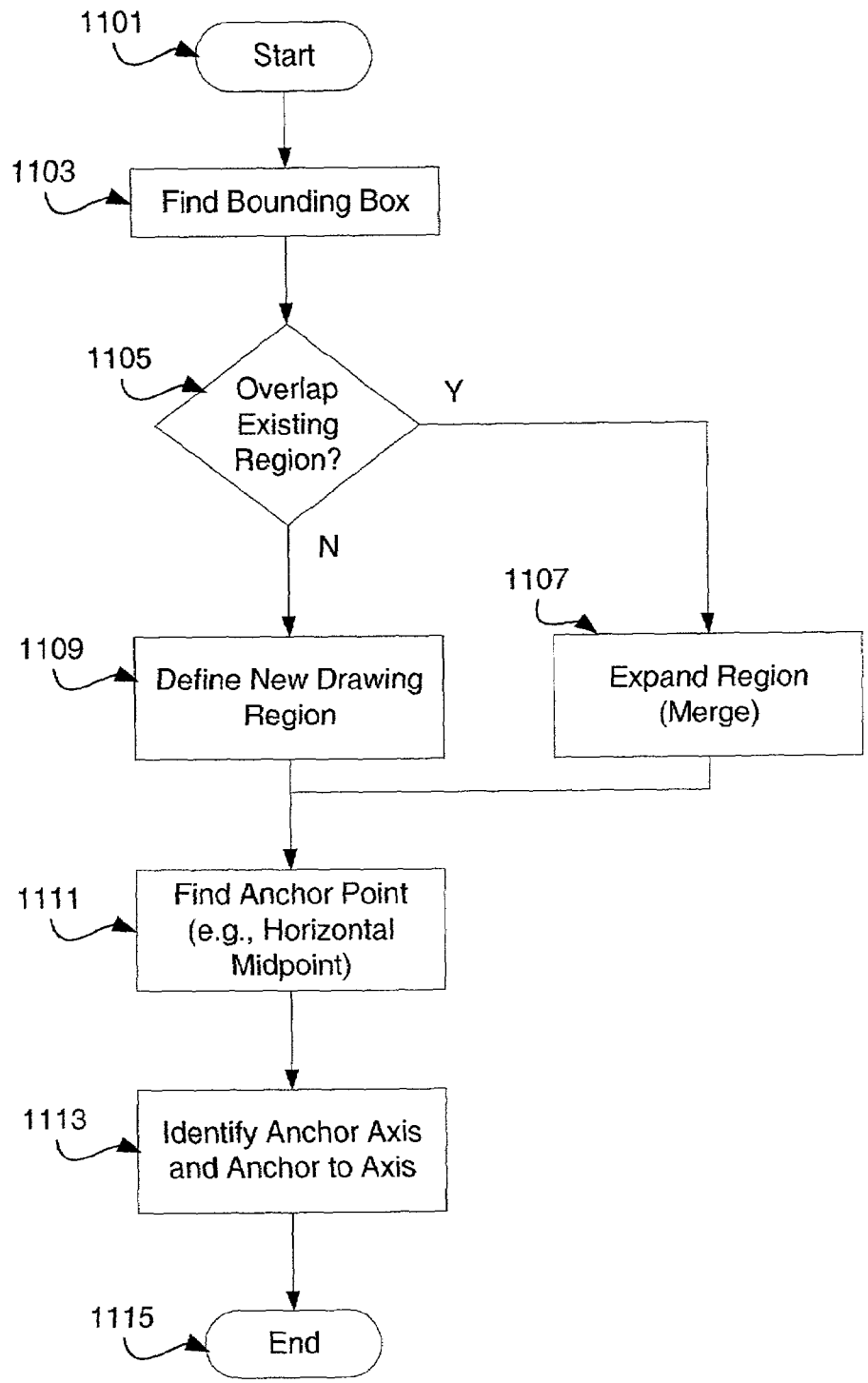
FIGS. 11A–D illustrate a process, and example drawings manipulated by the process, according to one embodiment of the present invention.
Figure 11B:
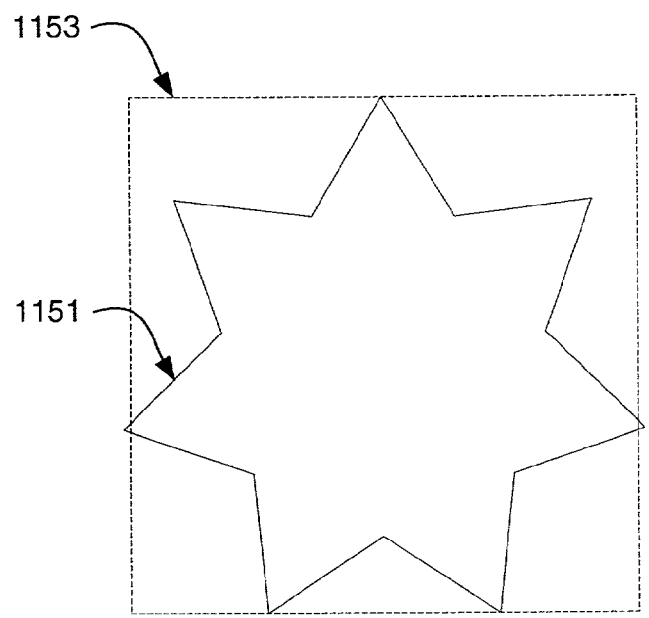

FIG. 11A illustrates an example process for the addition of drawings to a document. At the start in step 1101, it is determined that a new drawing is being added to the document, and the new drawing is displayed in the document. In step 1103, a bounding box is identified for the drawing to be added. This bounding box may represent an area occupied by the drawing, and may include more area than the actual drawing itself. For example, the bounding box may be the box defined by the minimum X- and Y-coordinates, and the maximum X- and Y-coordinates, of any point in the drawing. FIG. 11B shows an example of a newly-added drawing 1151 with its bounding box 1153.

In step 1105, the bounding box 1153 for the newly-added drawing 1151 is compared with existing bounding boxes 1163 for existing drawings 1161 to determine if overlap exists. This may be determined by checking to see if any points or pixels in one drawing's bounding box are also within another drawing's bounding box. For example, if bounding boxes are represented as X and Y coordinates, the comparison of two drawing bounding boxes (A and B) may use the following comparison:

FOR any point in bounding box A,
 IF X coordinate is between drawing B's maximum and minimum X values, AND Y coordinate is between drawing B's maximum and minimum Y values,
 THEN overlap exists.

Figure 11C:
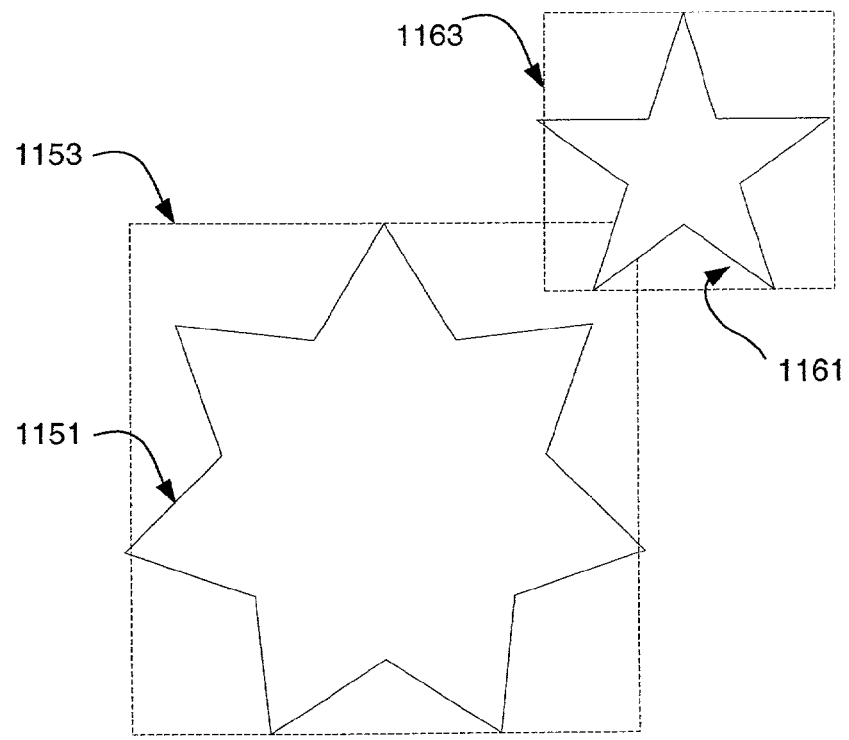
Figure 11D:
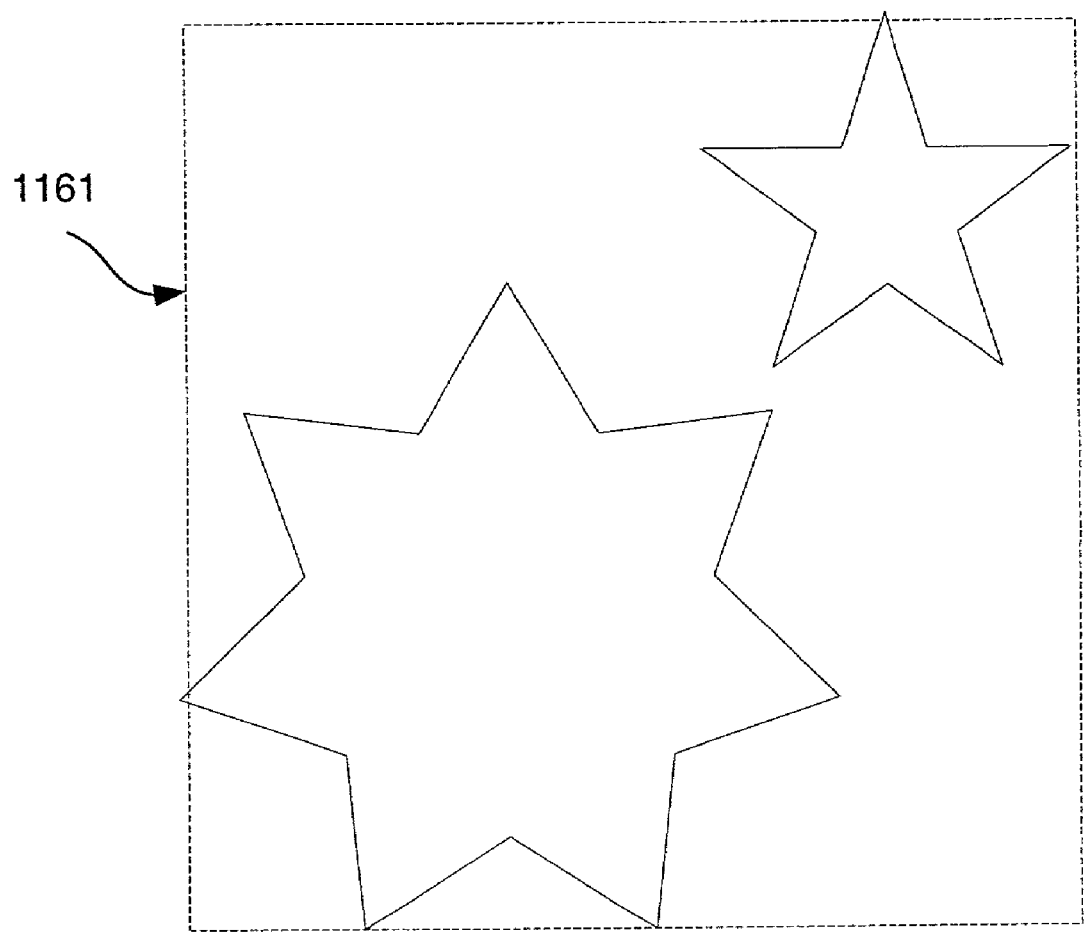

If overlap does exist, as shown in FIG. 11C, the newly-added drawing is simply added, in step 1107, as part of the existing drawing 1161, resulting in an expanded drawing and expanded bounding box 1165, as shown in FIG. 11D. Adding the new drawing to the existing one may simply be a matter of defining a new bounding box containing both drawings, and adjusting the data for the new drawing to use the existing drawing's anchor point. For example, a new bounding box representing the combined drawings may be defined by determining the maximum and minimum X and Y coordinates for any point in existing drawing 1161 or new drawing 1151. The data for the new drawing, which may have previously used its own anchor point, may then be recalculated to reference the existing drawing's anchor point instead. As one example, this may be accomplished by first comparing the relative orientation between the two drawings' anchor points. If new drawing A's anchor point is 100 pixels to the right of, and 200 pixels above, existing drawing B's anchor point, then the data for the various points in new drawing A may be adjusted to reflect a new anchor point that is 100 pixels to the left of, and 200 pixels below, its previous anchor point. After expanding the bounding box region, the process may move to step 1111.

If, in step 1105, no overlap existed, then the process may move to step 1109, in which the newly-added drawing 1151 is classified as a separate drawing, distinct from existing drawings.

Then, in step 1111, the anchor point of the expanded drawing (if overlap existed) or the newly-added drawing (if no overlap existed) may be revised. As discussed above, an anchor point may be made simply by calculating the center of the drawing. If a new drawing was added to an existing one, the center may now be different. Alternatively, and as described above, the determination of the anchor point may be made using a weighted approach, to find the "center of mass" for the new (or newly-expanded) drawing. This may be accomplished, for example, by totaling, for each X-coordinate in the drawing, the number of pixels in the drawing that have that X-coordinate. When this is accomplished for each X-coordinate, it may then be possible to find the weighted midpoint X-coordinate by finding the X-coordinate in which the difference between the number of pixels having a lesser X-coordinate (e.g., to its left) and the number of pixels having a greater X-coordinate (e.g., to its right) is minimized (or zero, if possible). It will be understood that other approaches to calculating such a "center of mass" may also be used. Similar steps may be used to calculate the vertical center as well.

Once the new anchor point is determined, the process may then determine, in step 1113, to which region in the document (e.g., regions 705, 707, 709 in FIG. 7) the drawing should be anchored. Again, and as described above, this determination may be made by simply determining which region contains the horizontal midpoint determined in step 1111. Alternatively, this determination may be made by determining which region's reference axis is closest to the drawing's anchor point, and selecting that region for anchoring the drawing.

Once the appropriate region is identified, then the system simply records the necessary information to indicate that the particular drawing is now anchored to the identified region, and an offset value is calculated. This offset value, as discussed above, may be the distance between the drawing's horizontal midpoint and the reference axis for the identified region, and may be used for future resealing.

A record may be retained in memory of the various horizontal offsets and scaling information, for each drawing, that were used with previous line heights. With this information, if the line height were returned to a previously-used line height, the drawings may be returned to their original size and position, rather than undergoing the resizing/reposition steps discussed above. In this manner, processing may be reduced if a user were to change his or her mind regarding a line height adjustment, or if the user no longer needs the modified line height. Of course, this may be presented to the user as an option upon returning the line height to a previously-used value. For example, the user may be prompted upon returning to the line height to request whether previously-used scale and offset values should be restored.

Figure 12:
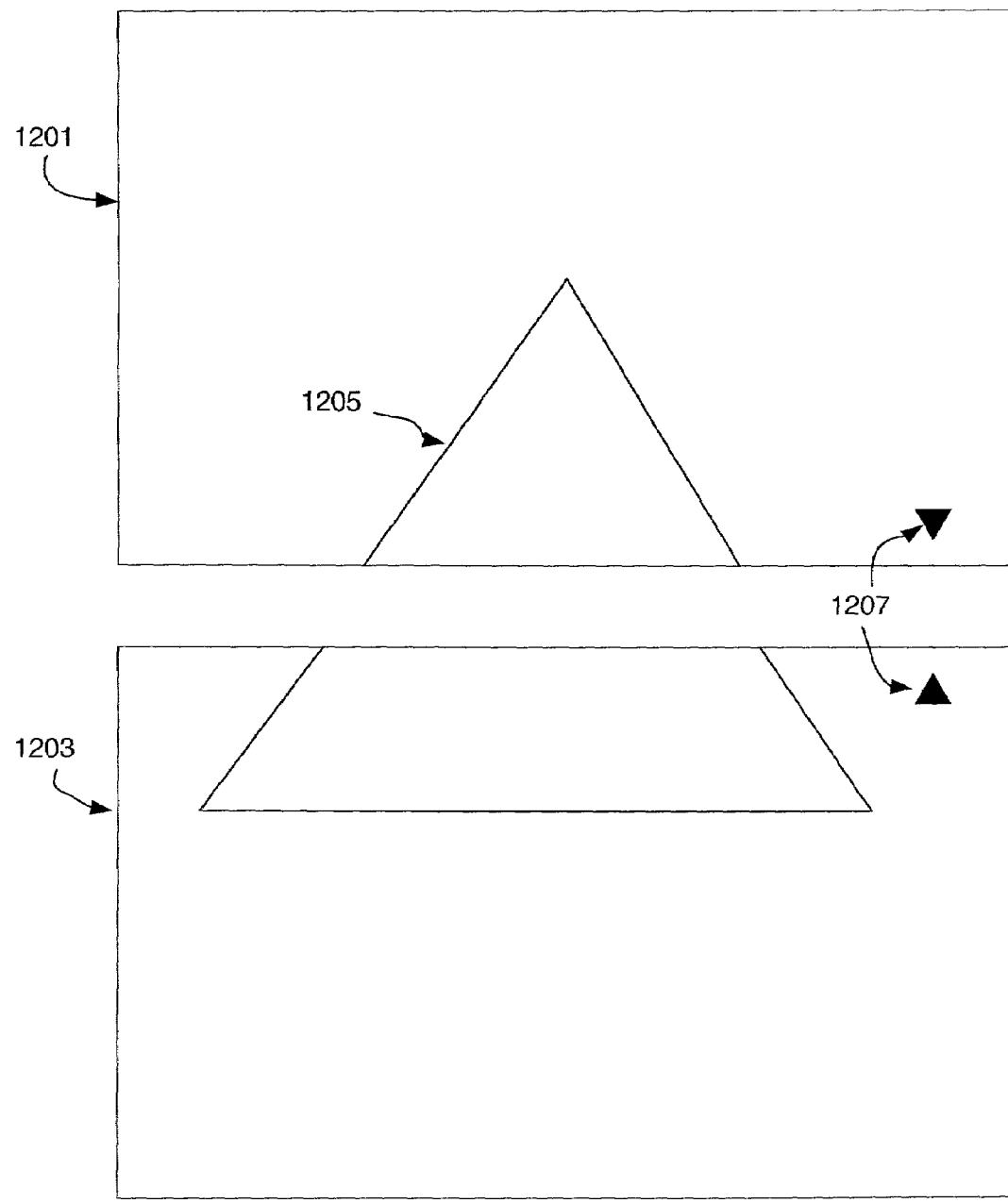
FIG. 12 illustrates two sequential pages in an electronic document according to one embodiment of the present invention.

With the repositioning of text and drawings due to the change in line height, drawings may often be forced to shift such that they no longer fit on the current page. FIG. 12 illustrates two pages 1201, 1203 over which a drawing 1205 is spread. In some situations, it is preferable to display the portion of drawing 1205 on page 1201, as opposed to moving the entire drawing 1205 to the next page 1203, to provide clear feedback to the user regarding what space is available on page 1201. If, for example, drawing 1205 were simply moved to the next page 1203, the user might mistakenly believe that additional space were available at the end of page 1201. Further additional feedback may be provided to the user in the form of directional arrows 1207, which indicate that the drawing continues on the next or previous page.

Although various embodiments are illustrated above, it will be understood that the embodiments include various aspects and features that may be rearranged in combinations and subcombinations of features disclosed. The scope of this invention encompasses all of these variations, as defined by the claims that follow.

We claim:

1. A method for editing an electronic document containing drawings, comprising the steps of:

dividing said document into a plurality of regions, each region having a reference axis, and wherein positions of said drawings are identified with respect to said axes;

receiving a request to modify a line size in a text portion of said document;

rescaling said drawings in accordance with said axes and proportional to the modification in line size of the text portion;

determining if said rescaled drawings overlap with one another;

if said rescaled drawings are determined to overlap, repositioning one or more of said drawings such that said overlap no longer exists;

determining if a size of said repositioned drawings exceeds a predetermined limit; and if said size is determined to exceed said limit, rescaling the repositioned drawings such that said size no longer exceeds said limit, wherein said predetermined limit is a distance between a right margin and a left margin of said document.

2. The method of claim 1, wherein said step of rescaling said drawings further comprises the step of rescaling offset distances between reference points of said drawings and said axes.

3. The method of claim 1, wherein said plurality of regions includes a left margin region, a body region, and a right margin region.

4. The method of claim 1, wherein said reference axes are horizontally-located in the center of said regions.

5. The method of claim 1, wherein said drawings each include an anchor point.

6. The method of claim 5, wherein said anchor point is a center of said drawing.

7. The method of claim 5, wherein said anchor point is a corner of said drawing.

8. A computer-readable medium, having computer-executable instructions for performing the steps of:

dividing said document into a plurality of regions, each region having a reference axis, and wherein positions of said drawings are identified with respect to said axes;

receiving a request to modify a line size in a text portion of said document;

rescaling said drawings in accordance with said axes and proportional to the modification in line size of the text portion;

determining if said rescaled drawings overlap with one another;

if said rescaled drawings are determined to overlap, repositioning one or more of said drawings such that said overlap no longer exists;

determining if size of said repositioned drawings exceeds a predetermined limit; and if said size is determined to exceed said limit, rescaling the repositioned drawings such that said size no longer exceeds said limit, wherein said predetermined limit is a distance between a right margin and a left in of sad document.

9. The computer readable medium of claim 8, wherein said step of rescaling said drawings further comprises rescaling offset distances between reference points of said drawings and said axes.

10. The computer readable medium of claim 8, wherein said plurality of regions includes a left margin region, a body region, and a right margin region.

11. The computer readable medium of claim 8, wherein said reference axes are horizontally-located in the center of said regions.

12. The computer readable medium of claim 8, wherein said drawings each include an anchor point.

13. The computer readable medium of claim 8, wherein said repositioning includes repositioning said rescaled drawings in proportion to said modification in line size of the text portion.

14. A portable computing device, comprising:
- a display screen, wherein at least a portion of an electronic document is displayed on said display screen, said document containing drawings; and
- a computer-readable medium, having computer-executable instructions for performing the following steps:
    - dividing an electronic document into a plurality of regions, each region having a reference axis, and wherein positions of said drawings are identified with respect to said axes;
    - receiving a request to modify a line size of a text portion of said electronic document;
    - rescaling said drawings in accordance with said axes and proportional to the modification in line size of the text portion;
    - determining if said rescaled drawings overlap with one another;
    - if said rescaled drawings are determined to overlap, repositioning one or more of said rescaled drawings such that said overlap no longer exists;
    - determining if a size of said repositioned drawings exceeds a predetermined limit; and
    - if said size is determined to exceed said limit, rescaling the repositioned drawings such that said size no longer exceeds said limit,
    - wherein said predetermined limit is a distance between a right margin and a left margin of said document.

15. The device of claim 14, wherein said repositioning includes repositioning said rescaled drawings in proportion to said modification in line size of the text portion.

16. The device of claim 14, wherein said computer-readable medium further includes computer-readable instructions for, responsive to said modification in said line size of the text portion of said document, repositioning said drawings, such that a first portion of one of said drawings is displayed on a first page of said document, and a second portion of the one of said drawings is displayed on a second page of said document.

17. The device of claim 14, wherein said step of rescaling said drawings further comprises rescaling offset distances between reference points of said drawings and said axes.

18. The device of claim 14, wherein said plurality of regions includes a left margin region, a body region, and a right margin region.

19. The device of claim 14, wherein said reference axes are horizontally-located in the center of said regions.

20. The device of claim 14, wherein said drawings each include an anchor point.

* * * * *